United States Patent [19]

Dick

[11] Patent Number: 4,471,413
[45] Date of Patent: Sep. 11, 1984

[54] HEADLIGHT UNIT FOR MOTOR CARS

[75] Inventor: Heinz Dick, Odenthal, Fed. Rep. of Germany

[73] Assignee: Ford Motor Company, Dearborn, Mich.

[21] Appl. No.: 527,616

[22] Filed: Aug. 29, 1983

[30] Foreign Application Priority Data

Sep. 2, 1982 [DE] Fed. Rep. of Germany ....... 3232608

[51] Int. Cl.³ .............................................. B60Q 1/26
[52] U.S. Cl. ....................................... 362/80; 362/83;
362/365; 362/273; 362/368; 362/289; 362/421;
362/350; 362/428
[58] Field of Search ................... 362/80, 83, 273, 222,
362/289, 350, 427, 430, 365, 368, 421, 428;
313/113

[56] References Cited

U.S. PATENT DOCUMENTS

| 3,949,215 | 4/1976 | Whitney | 362/80 X |
| 4,188,655 | 2/1980 | Tallon et al. | 362/80 X |
| 4,293,897 | 10/1981 | Deverrewaere | 362/306 X |
| 4,306,276 | 12/1981 | Dick | 362/80 X |

FOREIGN PATENT DOCUMENTS 1958761 11/1978 Fed. Rep. of Germany ........ 362/80

Primary Examiner—Peter A. Nelson
Attorney, Agent, or Firm—Daniel M. Stock; Clifford L. Sadler

[57] ABSTRACT

A headlight unit for a motor car has a reflector which is held pivotably at its edge areas on holding elements, one of which forms a fixed bearing and the other two of which are setting screws which form pivot bearings which permit the horizontal and vertical basic setting of the headlight to be adjusted. At the outer upper corner of the reflector there is provided a ball and socket joint which forms the fixed bearing of the headlight, and at the inner upper and lower corners of the reflector there is formed, in each case, a guiding edge which extends in an arcuate path relative to the fixed bearing. Guide catches formed at the top and bottom of a fastening member slide on the guiding edges. The fastening member is supported at the top by a pin which fits in a sleeve on the car bodywork to form—with the fixed bearing—the horizontal pivot axis of the headlight. At the bottom, the fastening member is supported by a slope-setting screw on the bodywork. Approximately in the center of the fastening member a lateral setting screw is received whose other end engages on the reflector and which is held pivotably movably on the fastening member by way of a membrane hinge.

1 Claim, 3 Drawing Figures

HEADLIGHT UNIT FOR MOTOR CARS

BACKGROUND OF THE INVENTION

The invention relates to a headlight unit for motor cars, which can be easily adjusted to alter its horizontal and vertical setting.

A headlight fastening of this type is already known from the German Offenlegungsschrift (Laid-open Specification) No. 28 32 395. In this headlight fastening, a reflector of plastic material is held pivotably at its edge areas on holding elements of resilient plastic material. One of the elements forms a fixed bearing and two further ones comprise setting screws which form pivot bearings by means of which the horizontal and vertical basic setting of the headlight may be adjusted relative to the bodywork of the motor car.

Although there is no indication in the material patent specification of the spatial arrangement of the holding elements in the front view of the headlight, as a rule the so-called fixed point is located above the elevation setting screw and the lateral setting screw is disposed on the opposite side to this arrangement. This can result, particularly when the motor car has a low front end, in the accessibility of one of the two setting screws being severely restricted.

A headlight fastening is also known from the German Auslegeschrift (Published Specification) No. 19 30 736, in which each setting screw is disposed in a fastening member which is supported on the bodywork.

In this known headlight fastening, the setting screws are on the top and underside respectively of a now customary rectangular headlight, as a result of which the overall or assembled height of the headlight is increased.

The now obligatory aerodynamic styling of a motor car leads to relatively low front ends, so that there is a decreasing amount of space available for receiving the headlights and their fastenings.

SUMMARY OF THE INVENTION

The invention seeks to provide a headlight fastening in motor cars which takes these conditions into account and which allows a headlight to be secured in a space-saving manner, in particular with respect to height, while permitting good accessibility of the setting screws which are required for the horizontal and vertical basic adjustment.

According to the invention, there is provided a headlight unit for a motor car having a reflector with, at the outer upper region of the reflector, a mounting attached to the reflector through a ball and socket joint and at the inner upper and lower regions of the reflector, guiding edges which extend in an arcuate path relative to the ball and socket joint and on which guide catches formed at the top and bottom of a fastening member slidingly engage. The fastening member has at the top a pin adapted to be held in an aperture in the car bodywork to form with the ball and socket joint—a pivot axis for the headlight, and has at the bottom a slope-setting screw adapted to be held on the bodywork by way of a bracket with, approximately in the center of the fastening member, a lateral setting screw the end of which engages on the reflector and which is held in the fastening member by way of a membrane hinge.

BRIEF DESCRIPTION OF THE DRAWINGS

The invention is described with reference to an exemplary embodiment illustrated in the attached drawings, in which.

DESCRIPTION OF THE PREFERRED EMBODIMENT

Figure 1:
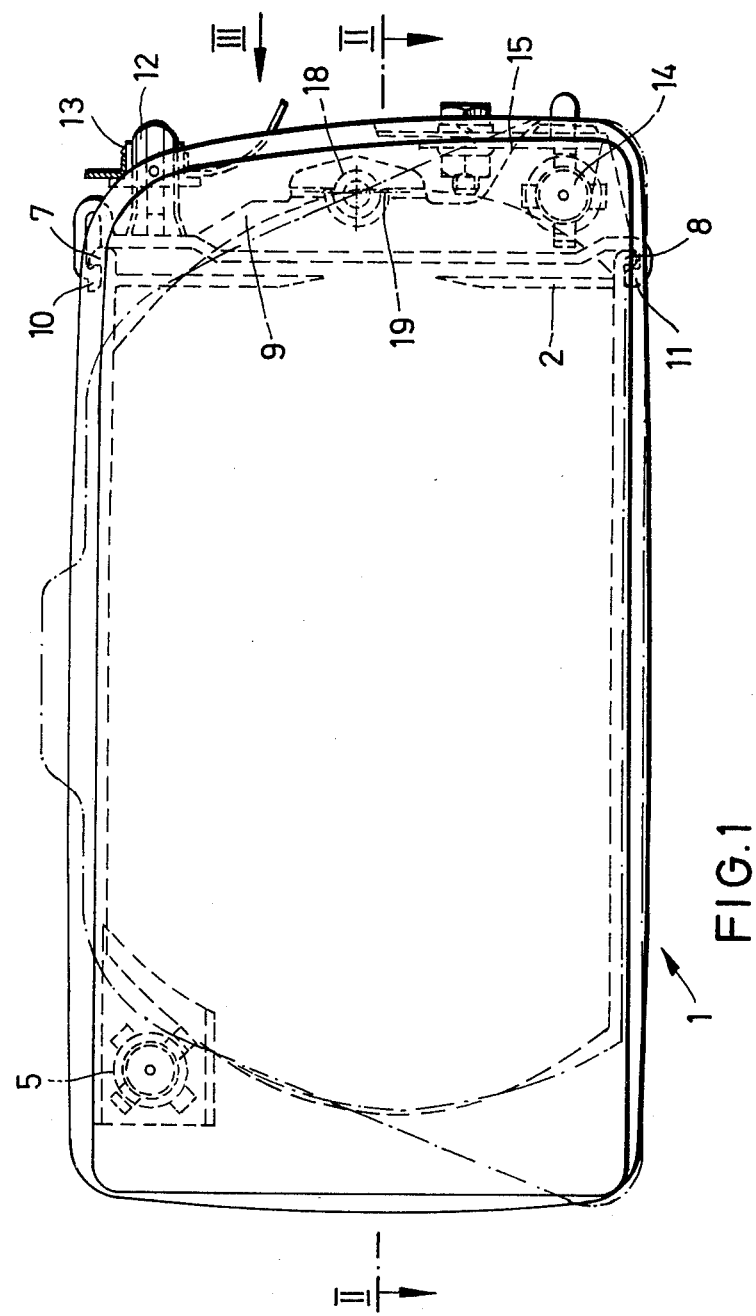
FIG. 1 is a front view of a headlight fastening according to the invention.
Figure 2:
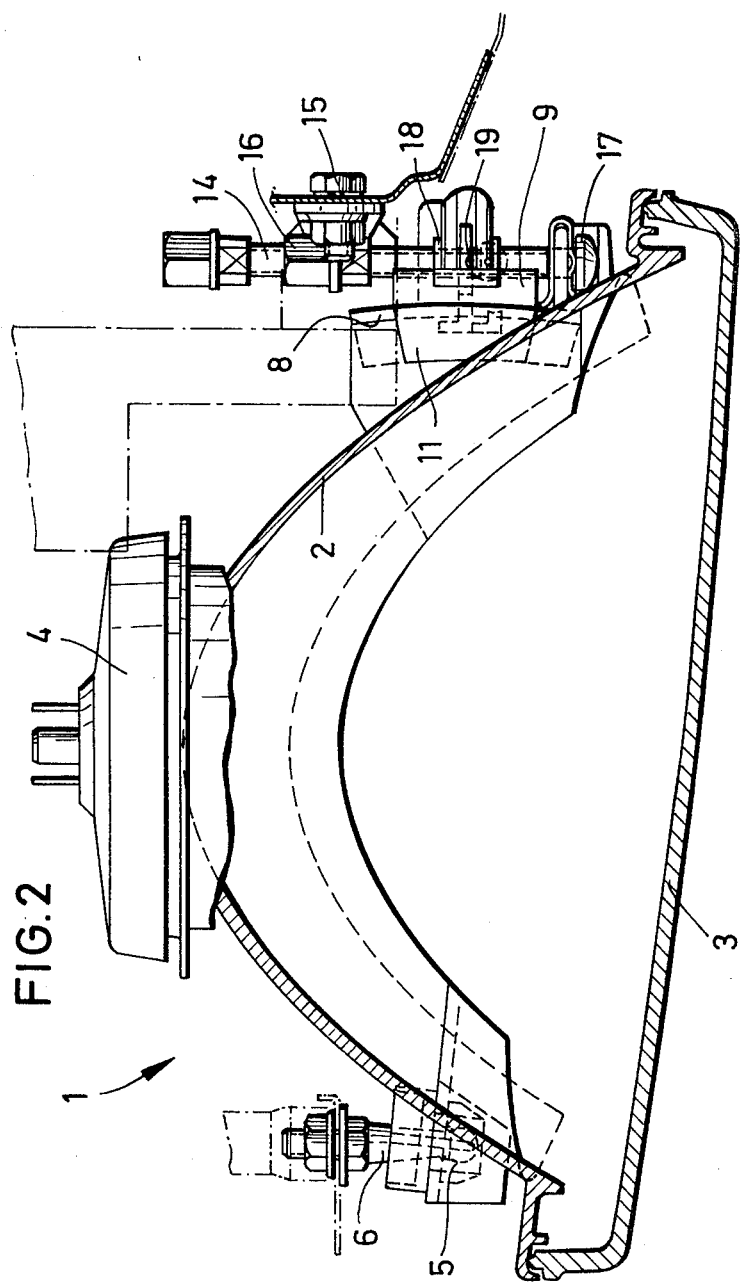
FIG. 2 is a section along the line II—II in FIG. 1.
Figure 3:
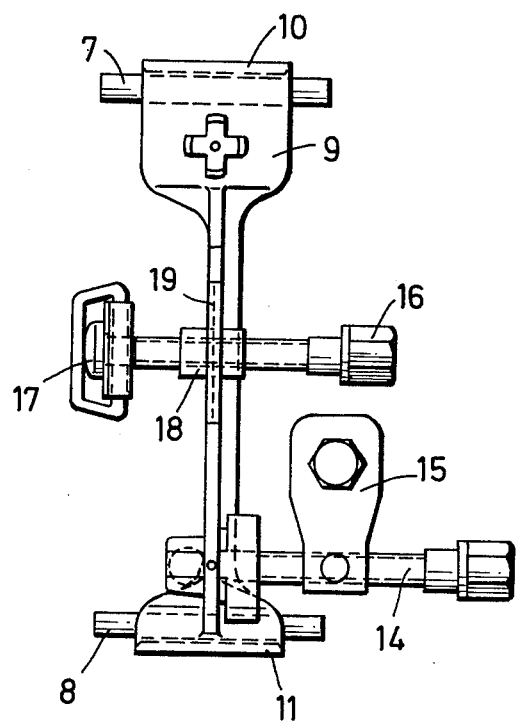
FIG. 3 is a side view in the direction of the arrow III in FIG. 1.

In the figures, a headlight unit 1 is shown which essentially comprises a reflector 2 of plastic material, a diffusing lens 3 of glass and a lamp holder 4 with an electric bulb (not shown).

At the upper end of the plastic reflector 2 towards the outside of the vehicle, there is provided a socket 5 which receives a ball on the end of a mounting pin 6 to form the fixed point of the headlight 1. At the upper and lower ends of the reflector closest to the center line of the vehicle there is formed, in each case, a guiding edge 7 and 8 which extends in an arcuate path relative to the fixed point. Guide catches 10 and 11 formed at the top and bottom of a fastening member 9 slidingly engage in each case over the guide edges 7 and 8 formed on the reflector 2.

The fastening member 9 is provided with a pin 12, by way of which it is supported in a sleeve 13 positioned in a bore in the vehicle bodywork. The axis through the holding attachment at the socket 5 for the ball pin 6 and through the pin 12 in the sleeve 13 forms the horizontal pivot axis of the headlight 1.

The fastening member 9 is supported at its lower end by a slope-setting screw 14 mounted on a bracket 15 on the vehicle bodywork.

Approximately in the center of the fastening member 9 a lateral setting screw 16 is provided whose other end 17 engages on the reflector 2 to effect movement about a vertical pivot axis. The holding attachment 18 of the lateral setting screw 16 is formed so as to be pivotably movable in the fastening member 9 by way of a membrane hinge 19.

As is evident from the embodiment of the invention shown in the drawings, the headlight fastening does not result in any increase in the overall height of the headlight. In addition, by virtue of the arrangement of all the necessary setting screws on the side of the headlight closest to the center line of the vehicle, the fastening ensures proper access for the purpose of adjusting the horizontal and vertical basic setting of a headlight.

I claim:

1. A headlight unit for mounting in the body of a motor vehicle, the headlight unit being mountable in a portion of the body spaced from the longitudinal center line of the vehicle and comprising:

a reflector;

a ball and socket joint interposed between the body and the headlight unit and carried at a position on the reflector proximate its upper terminus and outwardly placed with respect to the vehicle longitudinal center line;

a pair of vertically spaced, arcuately forwardly and rearwardly extending guide edge surfaces formed on the inner side, with respect to the vehicle longitudinal center line, of the reflector proximate the upper and lower ends thereof;

a vertically extending fastener member positioned inwardly with respect to the guide edge surfaces and having upper and lower guide catches formed thereon for slidingly engaging the guide edge surfaces;

a pin member carried in the body and pivotably engaging the upper end of the fastener to define with the ball and socket joint a horizontal pivot axis for the headlight unit;

a slope-setting screw carried in a portion of the body adjacent the lower end of the fastener member and operatively connected thereto to permit adjusting movement of the headlight unit about the pivot axis;

a lateral setting screw carried by the fastener member for threaded adjusting movement proximate the vertical center of the fastener member and engageable with a portion of the reflector to effect movement of the headlight unit along the arcuate path defined by the guide edges; and a membrane hinge carried with the fastener member for effecting a pivotally flexible connection between the lateral setting screw and the fastener member.

* * * * *